United States Patent [19]

Bluvband

[11] Patent Number: 5,826,008
[45] Date of Patent: Oct. 20, 1998

[54] SYSTEM AND METHOD FOR FAILURE REPORTING AND COLLECTION

[75] Inventor: Zigmund Bluvband, Rishon LeZion, Israel

[73] Assignee: A.L.D. Advanced Logistics Developments Ltd., Israel

[21] Appl. No.: 595,548

[22] Filed: Feb. 1, 1996

[30] Foreign Application Priority Data

Feb. 1, 1995 [IL] Israel ......................................... 112513

[51] Int. Cl.⁶ ................................................. G06F 11/32
[52] U.S. Cl. ............................... 395/185.1; 395/183.22; 364/188
[58] Field of Search .......................... 395/185.01, 185.1, 395/184.01, 183.22, 2.83; 348/82, 86, 92, 125; 379/67; 364/188

[56] References Cited

U.S. PATENT DOCUMENTS

| 3,919,466 | 11/1975 | Huwyler . | |
|---|---|---|---|
| 4,020,468 | 4/1977 | Silver et al. | 395/183.22 |
| 4,348,277 | 9/1982 | Cowlin et al. | 209/705 |
| 4,810,958 | 3/1989 | Mogi et al. | 324/73 R |
| 5,062,147 | 10/1991 | Pickette et al. | 364/900 |
| 5,086,393 | 2/1992 | Kerr et al. | 364/419 |
| 5,155,836 | 10/1992 | Jordan et al. | 395/500 |
| 5,231,670 | 7/1993 | Goldhor et al. | 381/43 |
| 5,239,376 | 8/1993 | Dittmann et al. | 358/101 |
| 5,317,627 | 5/1994 | Richardson, Jr. et al. | 379/88 |
| 5,534,914 | 7/1996 | Flohr et al. | 348/15 |
| 5,539,877 | 7/1996 | Winokur et al. | 395/185.01 |
| 5,559,894 | 9/1996 | Lubliner et al. | 382/100 |
| 5,594,861 | 1/1997 | Jonsson et al. | 395/185.01 |
| 5,617,312 | 4/1997 | Iura et al. | 364/188 |

FOREIGN PATENT DOCUMENTS

| 3827502 A1 | 3/1989 | Germany | G01M 17/00 |
|---|---|---|---|
| WO 93/12496 A1 | 6/1993 | WIPO | G06F 15/24 |

Primary Examiner—Joseph Palys
Attorney, Agent, or Firm—Londa and Traub LLP

[57] ABSTRACT

A failure reporting system which includes a plurality of reporting tools for reporting detected failures in a system to be observed is provided. The reporting tools include at least two tools from the group consisting of an audio reporting tool, a visual reporting tool and a text reporting tool. The audio reporting tool includes at lest one microphone, the visual reporting tool includes at lest one video camera and the text reporting tool includes at least one keyboard. The system also includes a control system for activating a selected number from the plurality of reporting tools at a time and an audio recognition unit for discriminating between audible reports and other audible information.

13 Claims, 4 Drawing Sheets

SYSTEM AND METHOD FOR FAILURE REPORTING AND COLLECTION

FIELD OF THE INVENTION

The present invention relates to systems and methods for failure collection systems generally and more particularly to systems and methods for failure collection and analysis.

BACKGROUND OF THE INVENTION

Failure collection systems, also termed Failure Reporting And Collection Systems (FRACAS) are well known in the art. FRACAS systems are employed to monitor the type, character, number and frequency of failures in a desired system, such as a production line of a consumer product or a series of vehicles of the same type.

In a typical FRACAS system, an operator collects the failures and issues a report listing the detected failures as textual information. Typically, FRACAS systems employ a computer to analyze the reported failures and therefore, the operator employs a portable computer to input the failures. Then, the same computer or a different one is employed in order to analyze the failures.

One drawback of prior art FRACAS systems is that textual descriptions are limited and therefore, the reports provided by the operator are often inadequate. Moreover, the operator may lack the proficiency to adequately describe the detected failure.

Another drawback of prior art FRACAS systems is that since the operator must employ his hands to report the failures, he cannot use them at the same time to uncover failures in the system or to fix them, and therefore, the time required to collect the failures in the system and to fix them is relatively long.

SUMMARY OF THE INVENTION

It is therefore an object of the present invention to provide an improved failure collection system.

Another object of the present invention is to provide an improved failure collection and analysis system.

According to the present invention, thus provided a failure reporting system, comprising:

a microphone input device for inputting failure data;

a video camera input device for inputting failure data;

a keyboard input device for inputting failure data and control data;

an electronic data processor;

and a communication link for establishing communication between all said input devices and said electronic data processor;

said electronic data processor including:

an audio recognition unit for recognizing and processing the failure data inputted by said microphone input device;

a visual recognition unit for recognizing and processing the failure data inputted by said video camera input device;

a storage unit for storing the data processed by said audio recognition unit and said video recognition unit;

and a control unit for selectively activating said input devices.

According to further features in the described preferred embodiment, the microphone is carried by a headset, which headset also includes headphones connected via the communication link to the electronic data processor; and the control unit produces an audible signal via the headphones to indicate the successful inputting of failure data from one of said input devices.

According to still further features in the described preferred embodiment, the control unit selectively activates the input devices by oral commands given via the microphone.

According to still further features in the described preferred embodiment, the electronic data processor further includes a display for displaying the processed data.

According to still further features in the described preferred embodiment, the electronic data processor further includes: a visual-to-text converter for converting visual data recognized by the visual recognition unit to textual data which is stored in the storage unit. It preferably also includes an audio-to-text converter for converting audio data recognized by the audio recognition unit to textual data which is provided as feedback to the operator and stored in the storage unit.

According to still further features in the described preferred embodiment, the electronic data processor further includes an information sorting and classification unit for sorting and classifying the inputted failure data according to specified criteria. Preferably, the electronic data processor also includes an analysis unit for analyzing the classified failure data.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
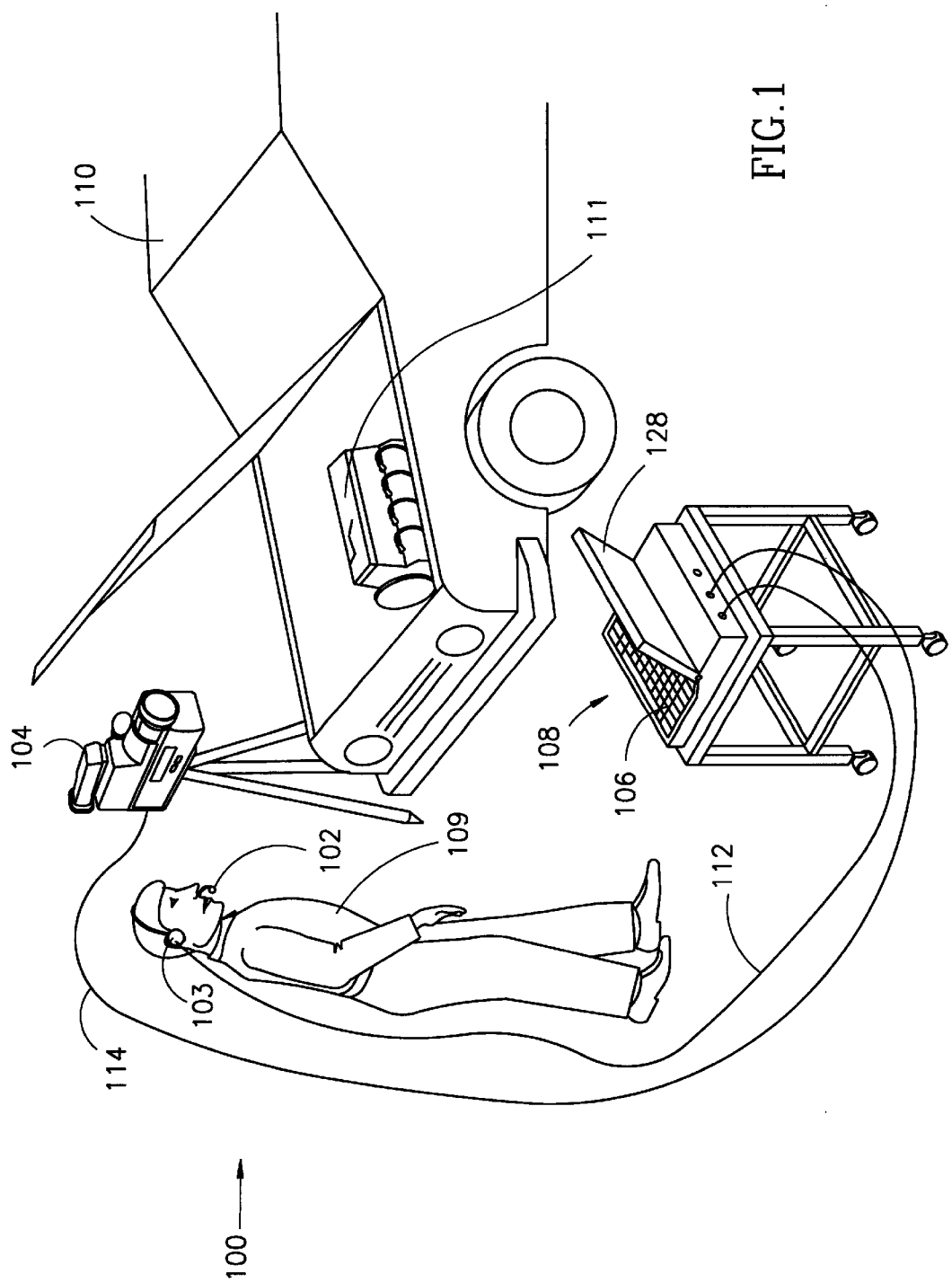
FIG. 1 is a pictorial illustration showing the utilization of a failure reporting system, constructed and operative in accordance with a preferred embodiment of the present invention.

Reference is now made to FIG. 1 which is a pictorial illustration showing the utilization of a failure reporting system, constructed and operative in accordance with a preferred embodiment of the present invention. The system of FIG. 1, generally referenced 100, preferably comprises a microphone 102, headphones 103, a video camera 104 and a keyboard 106, all of which are connected to a portable computer 106 by wires of sufficient length, referenced 112 and 114, respectively. The sufficiently long wires enable the system operator 109 to move freely around a target system 110, the failures of which are being detected and collected by the operator 109 and reported to the system 100.

Alternatively, the microphone, headphones and video camera may be connected to the computer 106 by any suitable wireless system, such as by the radio frequency (RF) transmitters and receivers manufactured by Sony of Japan.

The microphone 102, the video camera 104 and the keyboard 106, collectively referred to herein as the reporting tools, enable to input into the computer 106 audible, visual and textual information, respectively. The headphones 103 enable to receive an audible feedback from the computer 106, such as an indication that the input of a report is successful.

The computer 106 may be any suitable computer and preferably a portable computer, such as the portable computers manufactured by international Business Machines (IBM) of the USA.

The system operator 109 employs the system 100 to report the failures of the target system 110. In the illustrated preferred embodiment, the microphone 102 and the headphones 103 are located in a headset on the operator's head. This enables the system operator 109 to report audible failures, such as the crack 111, and to input commands for controlling the operation of a control system 132 (FIG. 2) while searching for failures. The headset frees the hands of the operator, which can be occupied with the falling system 110. It also enables the operator to receive, via the headphones 103, an indication of whether his input was successful.

Figure 2:
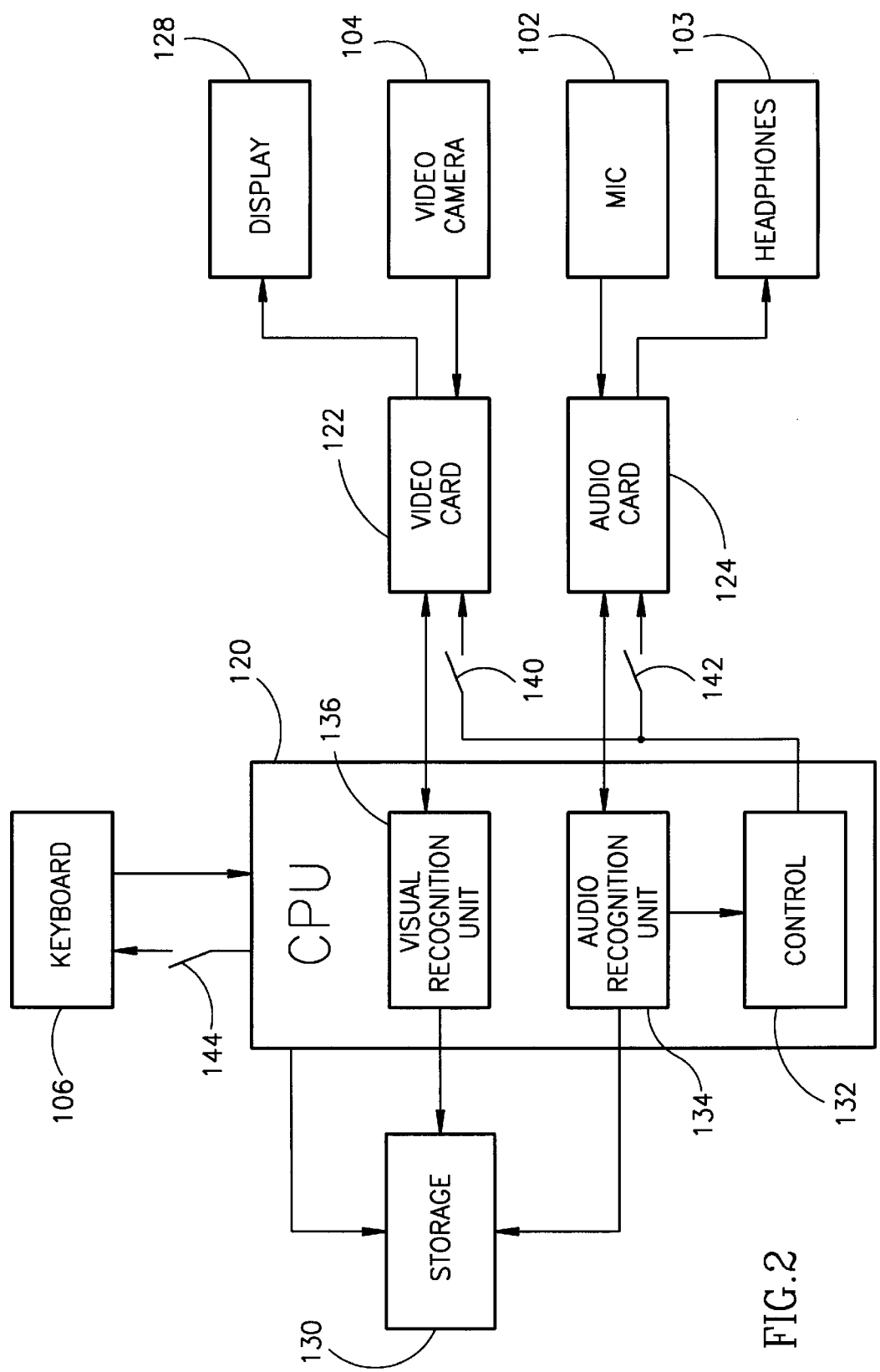
FIG. 2 is a block diagram illustration of the failure reporting system of FIG. 1.

Reference is now made to FIG. 2 which is a block diagram illustration of the system 100. Therefore, similar reference numerals are used for similar elements of FIGS. 1 and 2. As seen from FIG. 2, the computer 106 preferably comprises a Central Processing Unit (CPU) 120, such as the 80486 CPU manufactured and sold by Intel of the USA, a video card 122, an audio car 124, such as the Video Blaster and the Sound Blaster, respectively, both manufactured and sold by Creative Technologies of the USA, a display 128 and a storage unit 130, such as a hard disk. The microphone 102 and the headphones 103 are connected to the audio card 124 whereas the video camera 104 and the display 128 are connected to the video card 122.

The system 100 also preferably comprises a control system 132 which enables to activate one or more of the reporting tools at a time. Preferably, the control system 132 activates one or more of the reporting tools in accordance with oral commands provided by the system operator 109 via microphone 102. Alternatively, the control system 132 operates in response to commands entered via the keyboard 106. The control system preferably includes any application for activating video and audio circuits, such as the Navigator, manufactured and sold by IBM and operative with the Video Blaster and South Blaster cards, respectively.

The reporting of a detected failure starts with activating one or more of the reporting tools. Provided, for example, that the microphone 102 operates by default, by instructing a suitable command into the microphone 102, such as "activate visual", the system activates the video camera 104 as explained in more detail hereinbelow, so as to receive both audible and visual information.

The audible commands are directed via the audio card 124 to an audio recognition unit 134. Since the audible information is employed both to report failures and to instruct the system 100 to activate one of the reporting tools, the audio recognition unit 134 recognizes whether the audible input is a report of a failure, an instruction command or other audible information.

Preferably, the audio recognition unit also provides an audio indication which is received by the operator via the headphones 108. The audio indication may be any suitable indication, such as a statement indicating whether the input command or report has been received or not.

In the illustrated embodiment, the audio recognition unit 134 comprises any suitable application, such as the Continuous Speech Series (ICSS) manufactured and sold by IBM, operative in conjunction with the CPU 120. Alternatively, the audio recognition unit may include a dedicated card, such as the VR-160 card, manufactured and sold by Dialogic of New Jersey, USA.

When the audio recognition unit 134 recognizes an instruction command, such as "activate visual", it provides an indication to the control system 132 which, in turn, switches on the video camera 104 via a switch 140 and the video card 122.

Similarly, the control system 132 activates the microphone via switch 142 and the audio card 124 and the keyboard via the switch 144.

It will be appreciated that in the illustrated embodiment, the switches 140, 142 and 144 are not physical switches but switching commands provided by the control application, such as by the Navigator application. Alternatively, the switches may be physical switches and may be also positioned between the video card 122 and the video camera 104 and between the audio card 124 and the microphone 102.

Both visual and audible information may now be reported to the system 100. Visual information is recorded by a video camera 104 via the video card 122 and is directed to the storage unit 130. Audible information is recorded via the microphone 102 and the audio card 124. When the audio recognition unit 134 recognizes that the audible information is a failure report, the information is stored in the storage unit 130.

In the illustrated embodiment, the visual recognition unit 136 comprises a suitable application, such as the applications manufactured and sold by Orion Ltd. of Israel, operative in conjunction with the CPU 120.

Textual information can be reported via the keyboard 106 through the CPU 120 to the storage unit 130.

In the illustrated embodiment, only one video camera, one microphone and one keyboard are illlustrated for exemplary purposes. It will be appreciated that more than one video camera, microphone or keyboard can be employed. For example, a number of video cameras, preferably but not necessarily on tripods, can be located around the observed target system 110 and the system operator 109 may instruct the FRACAS system 100 as to which one of the video cameras should be activated in accordance with the exact location of the failure in the system 110.

According to one preferred embodiment of the present invention, the visual, audible and textual information collected and reported by the operator is stored in the storage unit 130 for analysis by any conventional FRACAS system. According to this embodiment, the operator or any other person displays the information stored in the storage unit 130 on the display 126 and either types a description of the detected visual and audible failures or transfers the textual reported failures, all as textual information, to any prior art FRACAS system for analysis.

According to another preferred embodiment of the present invention, the visual, audible and textual reported failures are processed by an automatic FRACAS system capable of analyzing visual, audible and textual information as explained in more detail hereinbelow.

Figure 3:
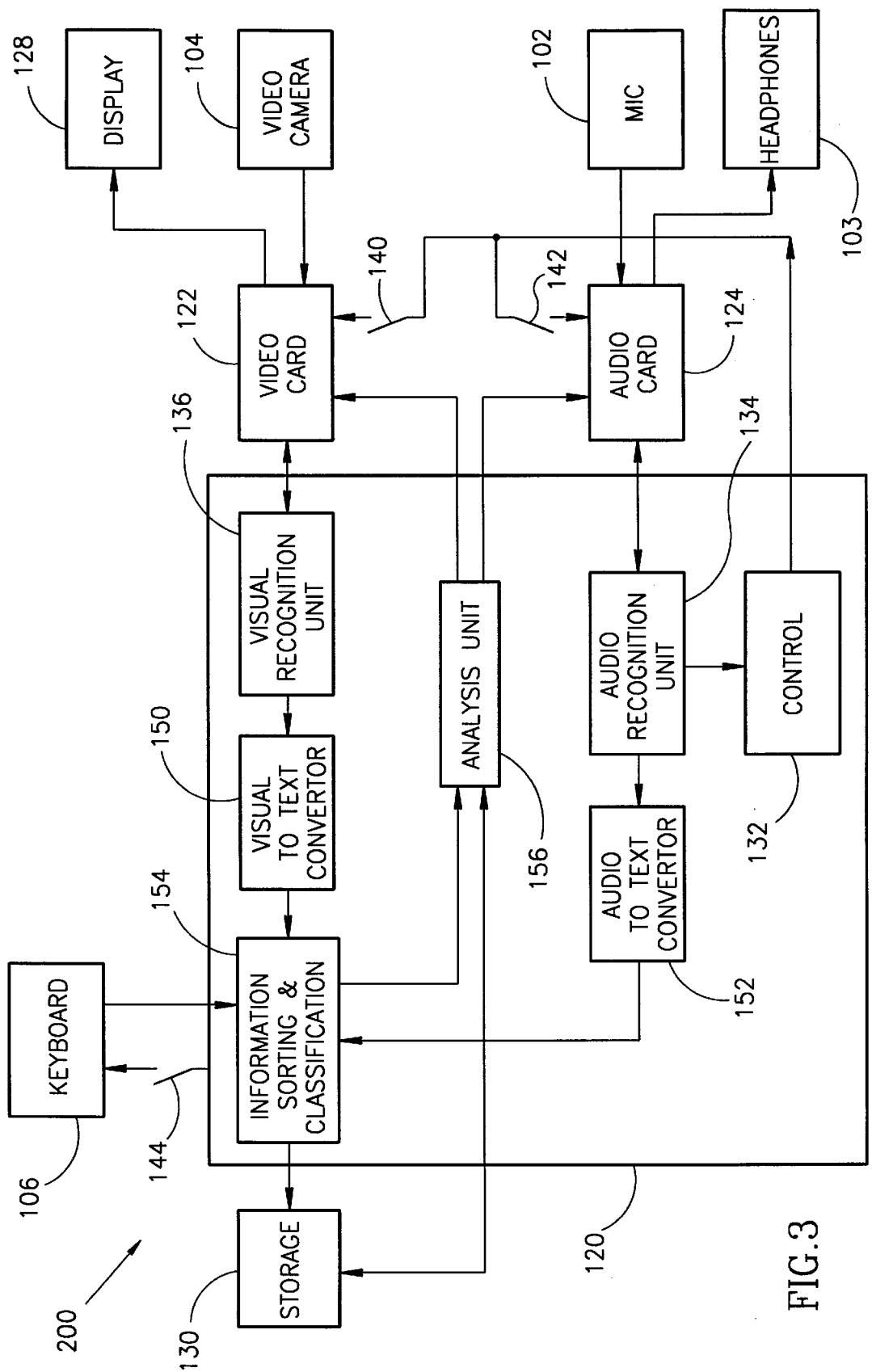
FIG. 3 is a block diagram illustration of a failure reporting and analysis system, constructed and operative in accordance with a preferred embodiment of the present invention.

References in now made to FIG. 3 which is a block diagram illustrating a failure reporting and analysis system, constructed and operative in accordance with a preferred embodiment of the present invention. The system of FIG. 3 operates to store failures reported by any one of the failure reporting tools as textual information, to analyze it and to provide information, such as graphic information or textual information, regarding the failures of the detected system, employing criteria such as the types, character, frequency and distribution thereof.

The system of FIG. 3, generally referenced 200, preferably comprises all the elements of there poring system 100 and therefore, similar elements have similar reference numerals to those of FIGS. 1 and 2. The system of FIG. 3 preferably also comprises a visual to text convertor 150 which operates to convert visual information recognized by the visual recognition unit as a visual failure report to textual inforamtion, and an audio to text convertor 152 which operates to convert audible information recognized by the audio recognition nit as an audio failure report to textual information.

The visual to text convertor may be any suitable convertor, such as the applications manufactured and sold by Orion, Israel.

The audio to text convertor 152 may be any suitable convertor, such as the application ICSS of IBM.

The failure reports provided by the visual to text convertor 150 and the audio to text convertor 152 are directed to an information sorting and classification unit 154 which also receives failure reports from the keyboard 106 via the CPU 120.

The information sorting and classification unit 154 operates to classify each of the reported failures according to any desired criteria, such as the type of failure and its characteristics. It may also associate the report with a catalog number in order to provide an indication as to which parts should be ordered in order to replace those which had failures.

The information sorting and classification unit 154 may be any suitable application, such as the FRACAS application manufactured and sold by the present assignee, Advanced Logistics and Developments (ALD) of Israel.

In the illustrated embodiment, the classified information is directed to the storage unit 130 and therefrom it may be retrieved by an analysis unit 156. The analysis unit 156 analyzes the classified information and provides information, such as graphic information or textual information, regarding the failures of the observed target system in terms of criteria, such as the types, character, frequency and distribution of the failures.

The analysis unit 156 preferably comprises any suitable application, such as the FRACAS applicator of ALD. The information produced by the analysis may be displayed by the display 128 or may be printed by any suitable printer. Alternatively, it can be present as audio information and may be displayed via the headphones 103.

In the illustrated embodiment, the analysis unit 156 forms part of the computer 106, it will be appreciated that the analysis unit 156 can be part of a separate system dedicated to analysis; for example, a computer with a faster processor than the 40486 CPU. According to this embodiment, the data may be retrieved from the storage unit 130 and transferred to a separate system comprising a suitable analysis unit, such as the analysis unit 156.

Figure 4:
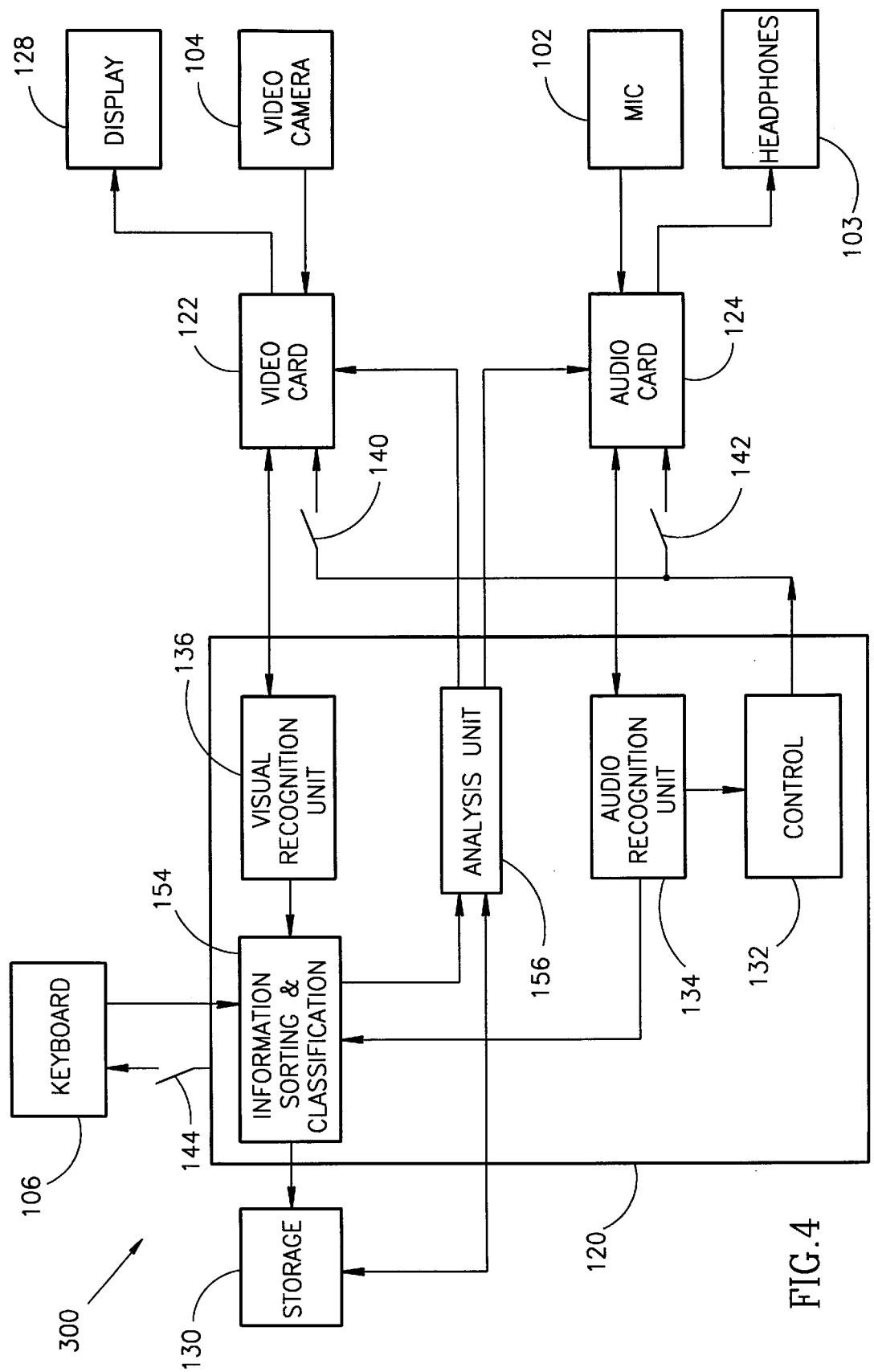
FIG. 4 is a block diagram illustration of a failure reporting and analysis system, constructed and operative in accordance with another preferred embodiment of the present invention.

Reference is now made to FIG. 4 which is a block diagram illustrating a failure reporting and analysis system, constructed and operative in accordance with a third preferred embodiment of the present invention. The system of FIG. 4, generally referenced 300, operates to store failures reported by any one of the failure reporting tools as textual information, to analyze the reported failures and to provide information, such as graphic information or textual information, regarding the failures of the observed target system in terms of criteria, such as the types, character, frequency and distribution of the failures.

The system 300 preferably comprises all the elements of the system 200, but it does not include an audio to text convertor and a visual to text convertor. Similar elements have similar reference numerals to those of FIG. 3.

The system 300 operates similarly to the system 200 but it classifies, stores and analyzes visual, audible and textual information.

The system 300 may employ all the applications referred to hereinabove with reference to the embodiment of FIG. 3, mutatis mutandis.

It will be appreciated that each one of the FRACAS systems described with reference to FIGS. 1–4 hereinabove may also include additional input means.

According to one preferred embodiment, any of systems 100, 200 and 300 may include a scanner for scanning images of a failure recorded independently of the images collected by the video camera 104; for example, pictures of failures taken by a conventional still camera.

According to a another preferred embodiment of the present invention, the scanner may scan documents which include textual reports recorded by hand. This may enlarge the amount of failure data analyzed by the analysis units so as to provide better trend analysis of the target system.

It will be appreciated that the preferred embodiments described hereinabove are described by way of example only, and that numerous modifications thereto, all of which fall within the scope of the present invention, exist. For example, each one of the systems 100, 200 and 300 may include a filtering unit for filtering the reported data, and preferably a separate filtering unit for filtering audible information and another filtering unit for filtering visual information.

It will be appreciated by persons skilled in the art that the present invention is not limited to what has been particularly shown and described hereinabove. Rather, the scope of the present invention is defined only by the claims that follow.

What is claimed is:

1. A failure reporting system, comprising:

a microphone input device for inputting failure data and control data;

a video camera input device for inputting failure data;

a keyboard input device for inputting failure data and control data;

an electronic data processor;

a communication link for establishing communication between all said input devices and said electronic data processor;

said electronic data processor including:

an audio recognition unit for recognizing and processing the failure data and control data inputted by said microphone input device;

a visual recognition unit for recognizing and processing the failure data inputted by said video camera input device;

a storage unit for storing the data processed by said audio recognition unit and said video recognition unit;

and a control unit for selectively activating said input devices in response to the processed control data.

2. The failure reporting system according to claim 1, wherein said microphone is carried by a headset, which headset also includes headphones connected via said communication link to said electronic data processor; and said control unit produces an audible signal via said headphones to indicate the successful inputting of failure data from one of said input devices.

3. The failure reporting system according to claim 1, wherein said control unit selectively activates said input devices by oral commands given via said microphone.

4. The failure reporting system according to claim 1, wherein said electronic data processor further includes a display for displaying the processed data.

5. The failure reporting system according to claim 1, wherein said electronic data processor further includes: a visual-to-text converter for converting visual data recognized by the visual recognition unit to textual data which is stored in said storage unit.

6. The failure reporting system according to claim 1, wherein said electronic data processor further includes an audio-to-text coverter for coverting audio data recognized by the audio recognition unit to textual data which is stored in said storage unit.

7. The failure reporting system according to claim 1, wherein said electronic data processor further includes an information sorting and classification unit for sorting and classifying said inputted failure data according to specified criteria.

8. The failure reporting system according to claim 7, wherein said electronic data processor further includes an analysis unit for analyzing the classified failure data.

9. The failure reporting system according to claim 1, wherein said communication link is a wired communication link.

10. The failure reporting system according to claim 1, wherein said communication link is a wireless communication link.

11. A failure reporting system, comprising:

a microphone input device for inputting failure data and control data;

a video camera input device for inputting failure data;

a keyboard input device for inputting failure data and control data;

an electronic data processor;

a communication link for establishing communication between all said input devices and said electronic data processor;

said electronic data processor including:

an audio recognition unit for recognizing and processing the failure data and control data inputted by said microphone input device;

a visual recognition nit for recognizing and processing the failure data inputted by said video camera input device;

a storage unit for storing the data process by said audio recognition unit and said video recognition unit;

and a control unit for selectively activating said input devices by oral commands given via said microphone in response to the processed control data;

said microphone being carried by a headset, which headset also includes headphones connected via said communication link to said data electronic processor;

said control unit producing an audible signal via said headphones to indicate the successful inputting of failure data from of said input devices.

12. The failure reporting system according to claim 11, wherein said electronic data processor further includes: a visual-to-text converter for converting visual data recognized by the visual recognition unit to textural data which is stored in said storage unit;

and an audio-to-text converter for converting audio data recognized by the audio recognition unit to textual data which is also stored in said storage unit.

13. The failure reporting system according to claim 11, wherein said electronic data processor further includes an information sorting and classification unit for sorting and classifying said inputted failure data according to specified criteria; and an analysis unit for analyzing the classified failure data.

* * * * *